United States Patent [19]
Ikedo et al.

[11] Patent Number: 5,684,363
[45] Date of Patent: Nov. 4, 1997

[54] DEUTERIUM GAS DISCHARGE TUBE

[75] Inventors: Tomoyuki Ikedo; Yoshinobu Ito; Ryotaro Matui, all of Hamamatsu, Japan

[73] Assignee: Hamamatsu Photonics K.K., Hamamatsu, Japan

[21] Appl. No.: 552,062

[22] Filed: Nov. 2, 1995

[30] Foreign Application Priority Data

| Feb. 17, 1995 | [JP] | Japan | 7-029564 |
| Feb. 17, 1995 | [JP] | Japan | 7-029580 |
| Mar. 1, 1995 | [JP] | Japan | 7-041823 |

[51] Int. Cl.⁶ .......................... H01J 17/04; H01J 19/42
[52] U.S. Cl. .......................... 313/613; 313/239; 313/292
[58] Field of Search ............................ 313/112, 117, 313/243, 292, 581, 589, 590, 613, 614

[56] References Cited

U.S. PATENT DOCUMENTS

| 2,916,646 | 6/1959 | Rohrer | 313/117 |
| 3,956,655 | 5/1976 | Pevo | 313/112 |
| 4,016,445 | 4/1977 | Cassidy et al. | 313/637 |
| 5,057,742 | 10/1991 | Kawai et al. | 313/292 |
| 5,552,669 | 9/1996 | Ikedo et al. | 313/613 |
| 5,587,625 | 12/1996 | Ikedo et al. | 313/613 |

FOREIGN PATENT DOCUMENTS 4-255662  9/1992  Japan ................... H01J 61/68

*Primary Examiner*—Michael Horabik
*Assistant Examiner*—Michael Day
*Attorney, Agent, or Firm*—Cushman Darby & Cushman IP Group of Pillsbury Madison & Sutro LLP

[57] ABSTRACT

A gas discharge tube includes a first spacer, a second spacer, an anode support member, and an anode. The first spacer is arranged to contact the rear surface of the focusing electrode support member and the front surface of the anode, and the second spacer is arranged to contact the front surface of the anode support member and the rear surface of the anode. This arrangement clamps the anode between the first and second spacers to hold the anode securely between the rear surface of the focusing support member and the front surface of the anode support member, keeping the distance between the focusing electrode and the anode constant. This structure improves the service life and the operational stability of the gas discharge tube during continuous light emission over an extended period of time.

22 Claims, 10 Drawing Sheets

DEUTERIUM GAS DISCHARGE TUBE

BACKGROUND OF THE INVENTION

1. Field of the Invention

The present invention relates to a gas discharge tube used as an ultraviolet light source for a spectrophotometer, liquid chromatography, or the like.

2. Related Background Art

A gas discharge tube is a discharge light source using positive column light emission by arc discharge of a gas sealed in a tube. A typical known gas discharge tube is a deuterium discharge tube in which ultraviolet light emitted by discharge of sealed deuterium is. This deuterium discharge tube is mainly used as an ultraviolet continuous spectrum source for a spectrophotometer or the like. Note that such a deuterium discharge tube is described in, e.g., Japanese Patent Application Laid-Open Gazette No. 4-255662.

SUMMARY OF THE INVENTION

In such a gas discharge tube, since very small variations of, e.g., 0.01% or 0.001% in the output is undesirable during long-time continuous light emission, strict characteristics are requested in many cases. Further, it is necessary to maintain the electrical insulating property between the focusing electrode and anode of the gas discharge tube during long-time continuous light emission.

It is an object of the present invention to provide a gas discharge tube which has a longer service life than the conventional gas discharge tube and is capable of improving the operational stability during long-time continuous light emission. It is further an object of the present invention to provide a gas discharge tube which can fully prevent a short circuit between the focusing electrode and the anode of the discharge tube.

A gas discharge tube of the present invention comprises:

an envelope (vessel) for sealing a gas such as deuterium therein;

lead pins introduced into an inner space of the envelope from external of the envelope; and a light-emitting assembly (light-emitting section) positioned at distal ends of the lead pins and supported by the lead pins while spaced from an inner side wall of the envelope, the light-emitting assembly including:

a focusing electrode support member made of a conductive material such as a metal, the focusing electrode support member having a front surface and a rear surface opposite to the front surface, the rear surface communicated with the front surface by a through hole;

a hot cathode for emitting thermoelectrons, the hot cathode being located at the front surface side of the focusing electrode support member, and being connected to and supported by at least one of the lead pins;

an anode for receiving the thermoelectrons emitted from the hot cathode, the anode being located at the rear surface side of the focusing electrode support member, facing an opening of the through hole, and being connected to and supported by another one of the lead pins;

a focusing electrode being supported by the focusing electrode support member, the focusing electrode having a focusing opening which is located at a position of an opening of the through hole for converging paths of the thermoelectrons, and being connected to and supported by another one of the lead pins;

a first spacer of an insulator such as a ceramic, the first spacer arranged between the focusing electrode support member and the anode and in contact with both the rear surface of the focusing electrode support member and a front surface of the anode;

a second spacer of an insulator such as a ceramic, the second spacer arranged opposite to the first spacer on the other side of the anode and in contact with a rear surface of the anode (the rear surface of the anode being opposite to the front surface thereof); and an anode support member of a conductive material such as a metal, the anode support member being located on an opposite side to the focusing electrode support member through the first spacer, the anode and the second spacer, and having a surface which is in contact with a surface of the second spacer for pushing the anode onto the rear surface of the focusing electrode support member between the first spacer and the second spacer, whereby an interval between the focusing electrode and the anode is defined by the focusing electrode support member and the first spacer.

The anode support member will have a depression at its surface facing to the focusing electrode support member for accommodating the anode, the first spacer and the second spacer, the depression extends from the surface of the anode support member in a vertical direction with respect to the rear surface of the focusing electrode support member.

Further, the gas discharge tube will comprise:

a discharge straightening plate for discharge shielding, the discharge straightening plate being positioned and mounted on the front surface of the focusing electrode support member, and having a slit for passing through thermoelectrons emitted from the hot cathode; and a front cover for discharge shielding, the front cover being positioned and mounted on the front surface of the focusing electrode support member to accommodate the hot cathode and the discharge straightening plate in a space defined by the front cover and the focusing electrode support member, the front cover having a window located at a position which faces to the focusing opening of the focusing electrode, for outputting light caused by discharge.

In the gas discharge tube of the present invention, the interval between the focusing electrode and the anode is defined by a surface of the first spacer, the rear surface of the focusing electrode support member and an inner wall surface of the focusing electrode support member, the inner wall surface defining the through hole.

The first spacer and the second spacer according to the present invention are preferably made of a ceramic, and the focusing electrode support member and the anode support member are preferably made of a metal.

In such a gas discharge tube, when an arc discharge occurs among the hot cathode, the focusing electrode and the anode, the anode generates heat upon reception of thermoelectrons, and the focusing electrode also generates heat upon bombardment of cations. However, in the gas discharge tube of the present invention, the anode is pressed against the focusing electrode support member by the anode support member through the first and second spacers and fixed to the focusing electrode support member through the first spacer, and the focusing electrode is supported on the front surface of the focusing electrode support member. For this reason, a predetermined interval between the focusing electrode and the anode can be strictly defined by the focusing electrode support member and the first spacer.

Therefore, even when the focusing electrode and the anode are heated during use of the gas discharge tube as mentioned above, the predetermined distance between the focusing electrode and the anode can be kept constant to prevent deformation of the path of the thermoelectrons between the focusing electrode and the anode. Thus the arc discharge state can be held stable, and the stability of light emission of the discharge tube will not be impaired. Additionally, the present invention prevents shortening of the service life of the discharge tube, caused by an increase in loss of the anode, and the like.

Further, in the gas discharge tube of the present invention, although the focusing electrode support member and the anode support member are conductive, the first and second spacers between which the anode is clamped and held at a predetermined position have electrical insulating properties. For this reason, the conductive anode can be electrically insulated from the conductive focusing electrode, the conductive focusing electrode support member and the conductive anode support member by the first and second spacers which having electrical insulating properties.

Furthermore, since the focusing electrode support member and the anode support member according to the present invention are made of a conductive material such as a metal, the focusing electrode support member can be fixed to the anode support member as well as the focusing electrode by welding. In a case where the discharge straightening plate and the front cover are made of a conductive material, these members can also be fixed to the focusing electrode support member by welding. Therefore, the gas discharge tube of the present invention is simple to produce.

The anode according to the present invention preferably comprises:
an anode fixing plate of a conductive material, the anode fixing plate having a front surface being in contact with the first spacer, and a rear surface being in contact with the second spacer; and
an anode plate for receiving the thermoelectrons, the anode plate being made of a high melting point metal such as molybdenum, and being fixed on the front surface of the anode fixing plate.

In the anode containing the anode plate and the anode fixing plate, it is preferable that a part of the front surface of the anode fixing plate is not covered with the anode plate to contact the anode fixing plate with the first spacer, and the anode plate (which is not in contact with the first spacer) forms a space defined by a surface of the first spacer, a front surface of the anode fixing plate and a surface of the anode plate.

Further, the first spacer according to the present invention preferably has a shape which enables the formation a depression defined by a surface of the first spacer and the rear surface of the focusing electrode support member and a depression defined by the surface of the first spacer and the front surface of the anode.

Specifically, it is preferable that the first spacer has a columnar shape, a prismatic shape such as a hexagonal or octagonal one, a spherical shape, or a block-like shape.

The shape of the second spacer according to the present invention is not particularly limited, but it is preferable that the second spacer also has a columnar shape, a prismatic shape such as a hexagonal or octagonal one, a spherical shape, or a block-like shape. The shape of the first spacer and the shape of the second spacer may be identical with, or different from, each other.

In the depression defined by the surfaces of the first spacer and the focusing electrode support member and the depression defined by the surfaces of the first spacer and the anode, an electrode material which would be sputtered from the anode and/or the focusing electrode by thermoelectrons during light emission of the gas discharge tube is prevented from depositing. Particularly, such an electrode material is prevented from depositing into a space defined by a surfaces of the first spacer, the anode fixing plate and the anode plate.

Therefore, in the gas discharge tube of the present invention, a short circuit between the focusing electrode and the anode can be fully prevented. Further, since the above relatively complex structure for preventing the deposition of the sputtered material is formed by the first spacer and the focusing electrode support member, both of which have relatively simple structures, the present invention in the gas discharge tube can not only prevent the short circuit, but also be easy to produce.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DETAILED DESCRIPTION OF THE PREFERRED EMBODIMENTS

The arrangement and function of a gas discharge tube according to the first embodiment of the present invention will be described below in detail with reference to FIGS. 1 to 6. The gas discharge tube of this embodiment is a side-on type deuterium discharge tube which emits light (ultraviolet light) from the side portion of the tube. Note that, in this embodiment, the front and rear sides are defined on the basis of the light emission direction.

Figure 1:
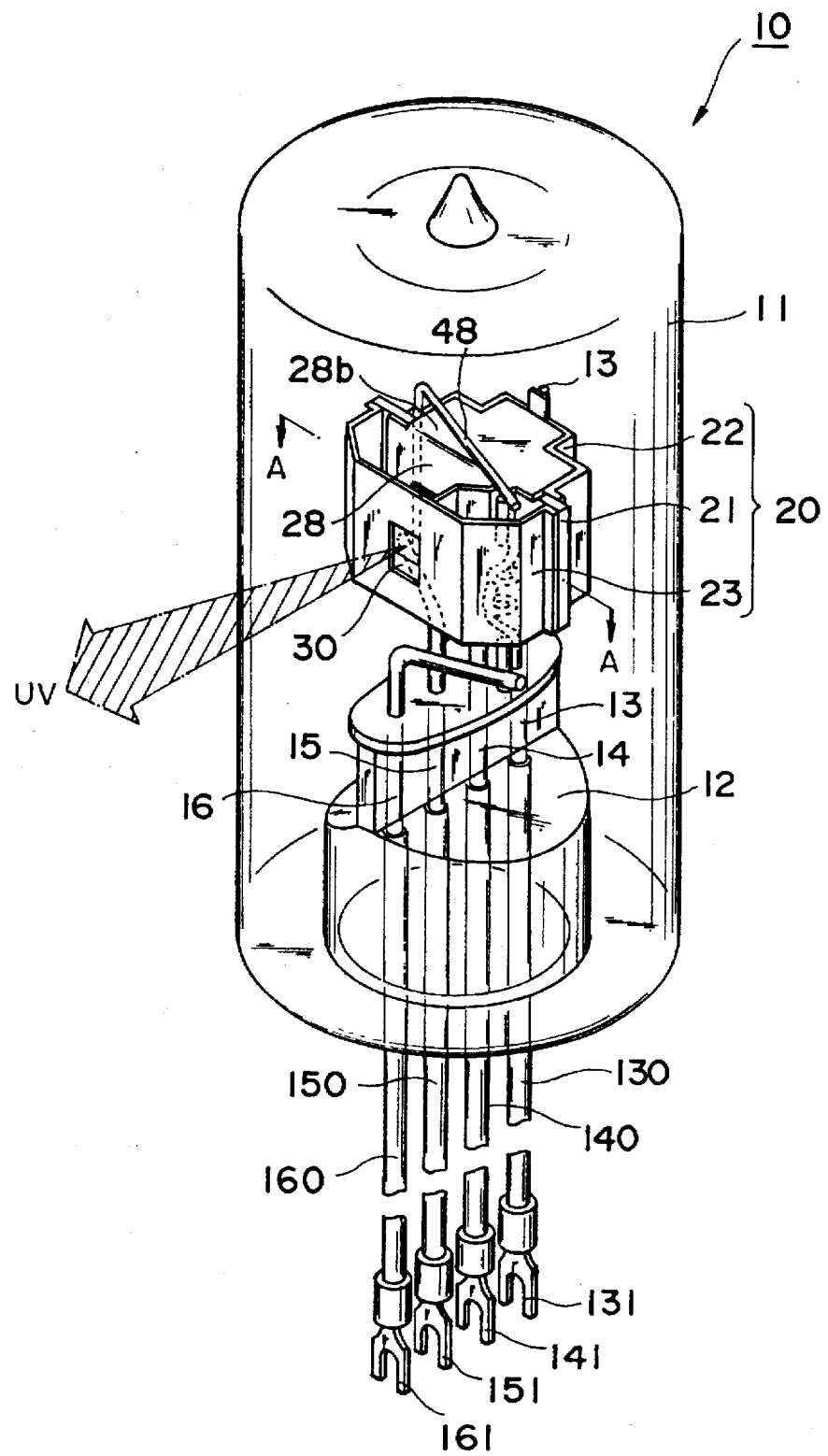
FIG. 1 is a perspective view showing an embodiment (first embodiment) of a side-on type gas discharge tube according to the present invention.

In a deuterium discharge tube 10 shown in FIG. 1, a light-emitting assembly (light-emitting section) 20 is accommodated in a cylindrical glass envelope 11 while being supported by lead pins 13 to 16. Deuterium gas is sealed in the glass envelope 11 at about several Torr. The envelope 11, with its head portion sealed, has a cylindrical shape, and the bottom portion of the envelope 11 is hermetically sealed by a glass stem 12. The envelope 11 is made of ultraviolet light-transmitting glass, quartz glass or the like which has a high permeability to ultraviolet light.

The four lead pins 13 to 16, which lie parallel alignment with each other extend through the glass stem 12 from the exterior of the envelope 11 and are covered by insulating members 130, 140, 150, and 160, respectively. Terminals 131, 141, 151, and 161 of the lead pins 13–16 will be connected to terminals of an external power supply. The light-emitting assembly 20 is positioned at distal ends of the lead pins 13–16 and is spaced from an inner side wall of the envelope 11. The light-emitting assembly 20 comprises a front cover 23 which is made of a metal such as Ni or SUS, or a ceramic; an anode support member 22 which is made of a metal such as Ni or SUS; and a focusing electrode support member 21 arranged between the anode support member 22 and the front cover 23 and made of a metal such as Ni or SUS.

Figure 2:
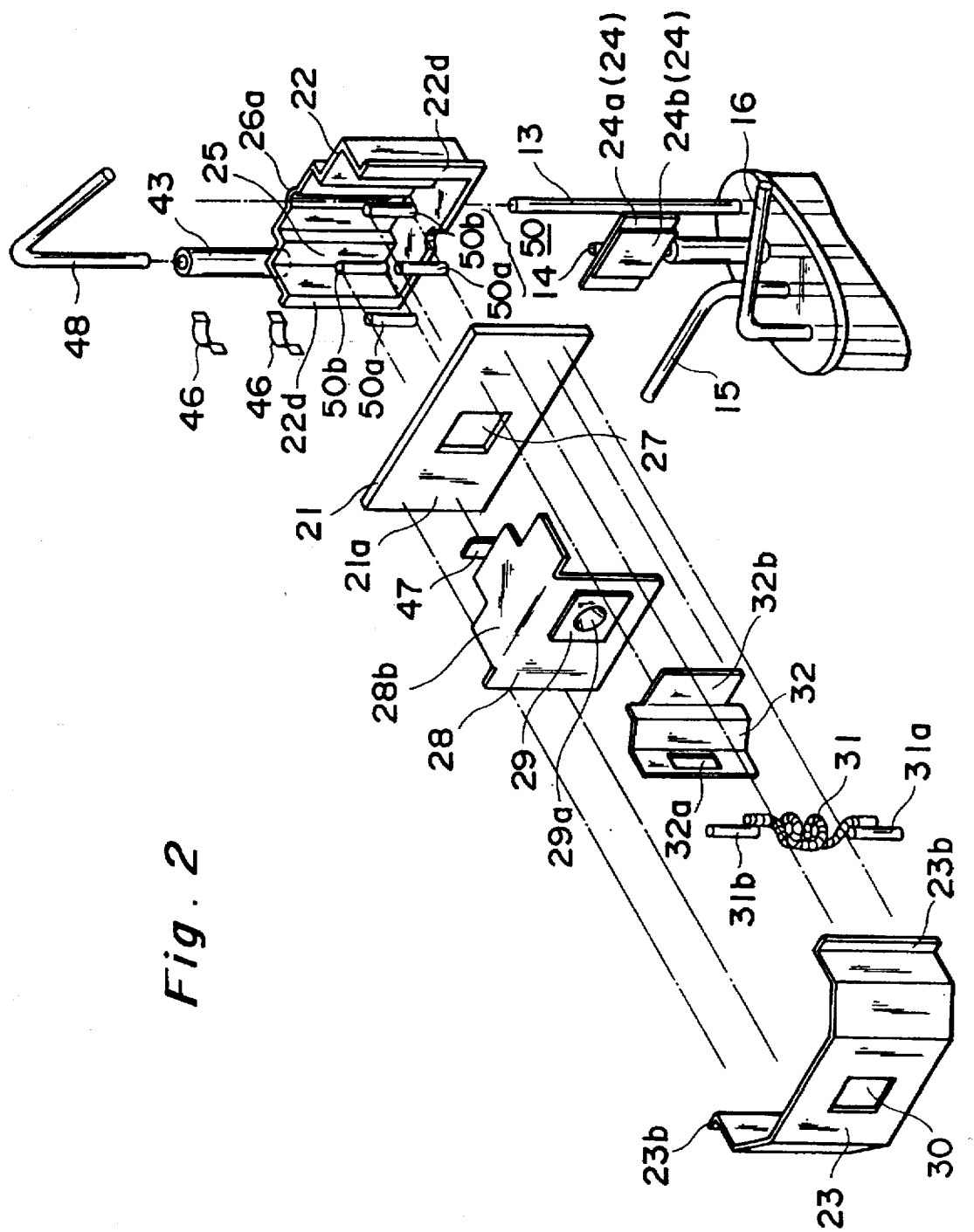
FIG. 2 is an exploded perspective view of a light-emitting assembly of the gas discharge tube shown in FIG. 1.

Specifically, the light-emitting assembly 20, as shown in FIG. 2, comprises: a hot cathode 31 for emitting thermoelectrons; an anode 24 for receiving the thermoelectrons emitted from the hot cathode 31; a focusing electrode 29 having a focusing opening 29a for converging and passing the thermoelectrons through; a focusing electrode support member (discharge shielding member) 21 for supporting the focusing electrode 29; two columnar first spacers 50a made of a ceramic and located between the focusing electrode support member 21 and the anode 24; two columnar second spacers 50b made of a ceramic and located on the opposite side from the first spacers 50a through the anode 24; and an anode support member 22 located on the opposite side from the focusing electrode support member 21 with the first spacers 50a, the anode 24 and the second spacers 50b in order to push the anode 24 onto the focusing electrode support member 21 between the first spacers 50a and the second spacers 50b. The light-emitting assembly 20 further comprises: a discharge straightening plate 32 mounted on the front surface 21a of the focusing electrode support member 21 and having a slit 32a for passing the thermoelectrons emitted from the hot cathode 31 through; and a front cover 23 mounted on the front surface 21a of the focusing electrode support member 21 and having a window 30 for outputting ultraviolet light (UV) caused by arc discharge.

The structure of the light-emitting assembly 20 will be described below in detail.

Figure 3:
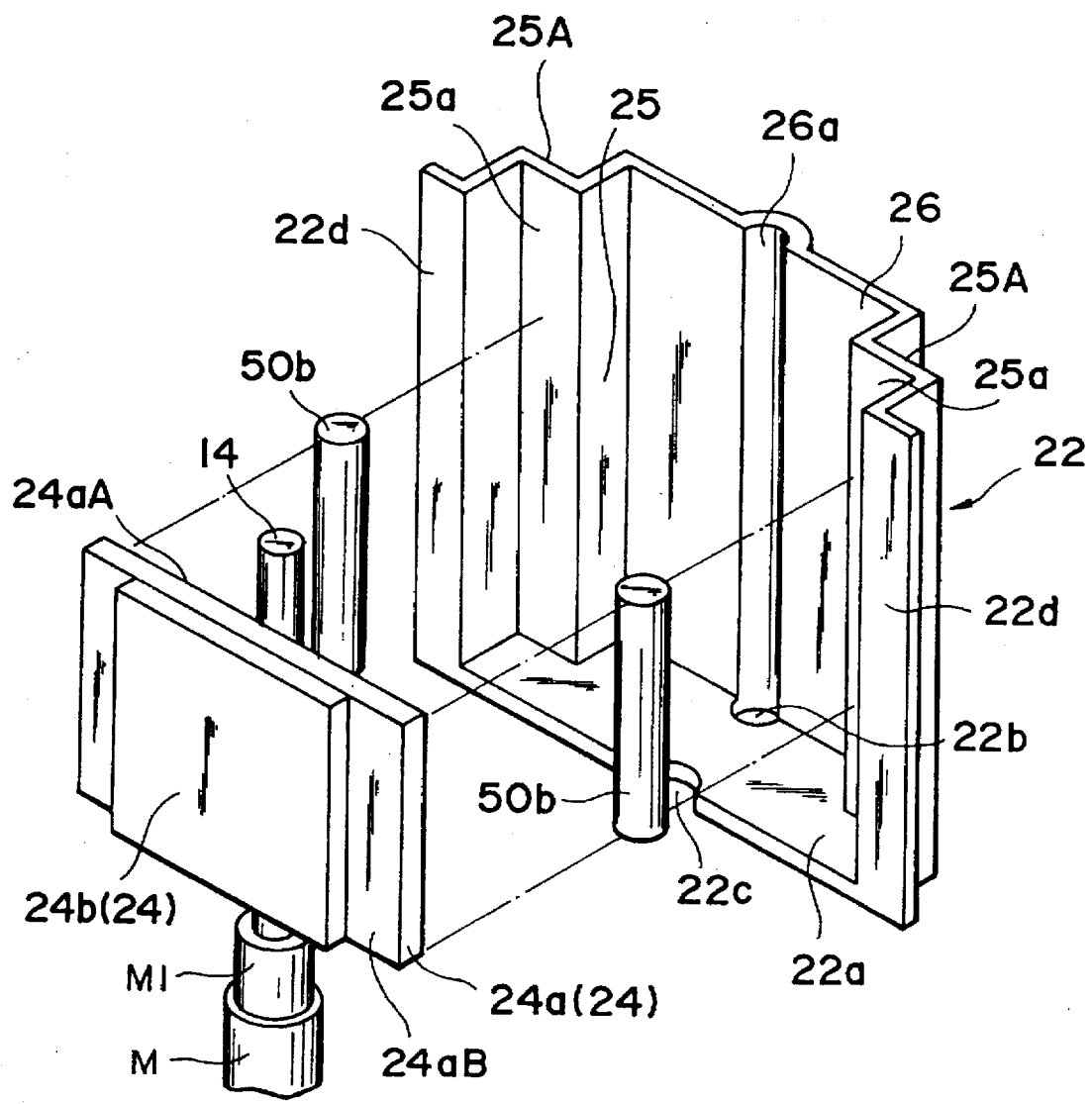
FIG. 3 is a perspective view showing a focusing electrode support member and an anode in the light-emitting assembly shown in FIG. 2.
Figure 5:
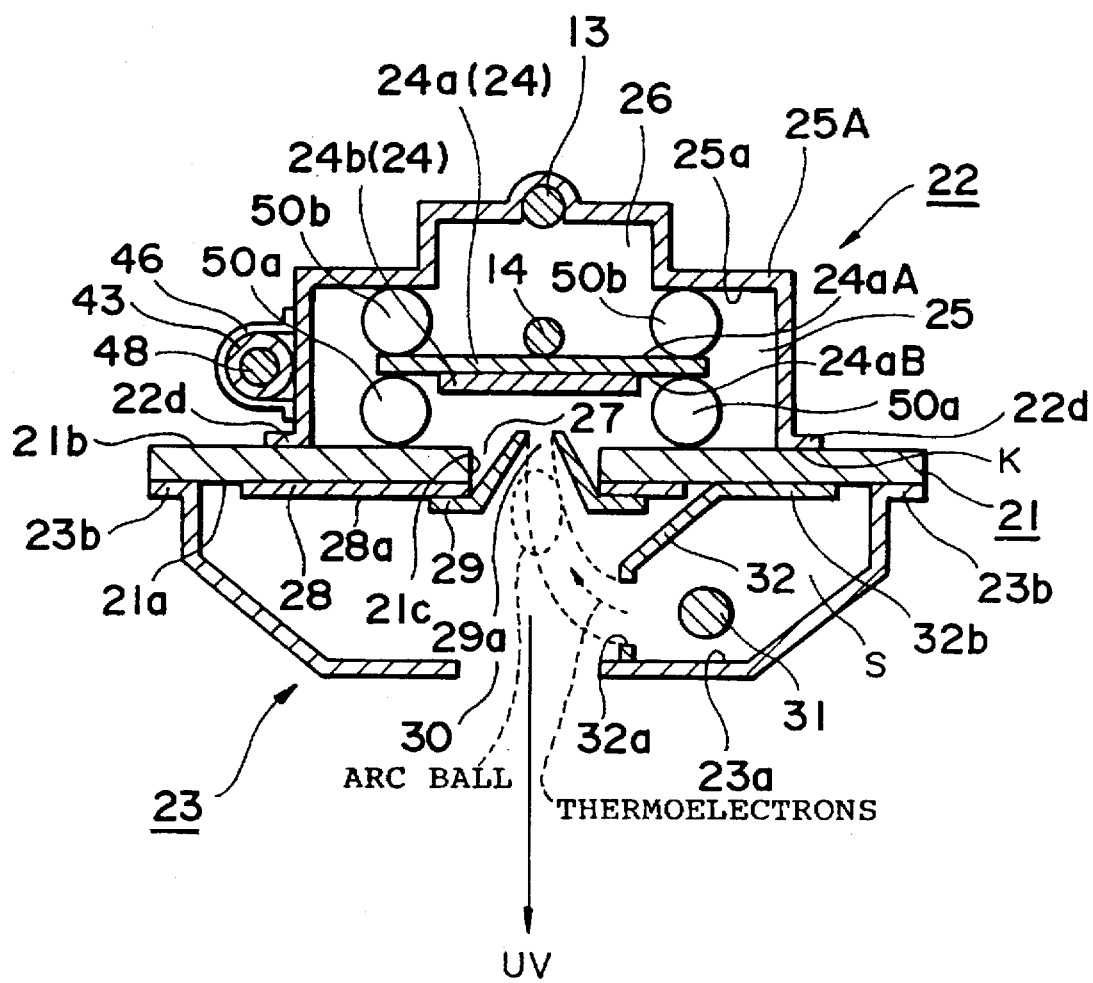
FIG. 5 is a horizontal sectional view of the light-emitting assembly of the gas discharge tube shown in FIG. 1 (taken along a line A—A in FIG. 1).

As shown in FIGS. 2, 3 and 5, an anode (anode portion) 24 is fixed at the distal end of the lead pin 14. This anode 24 is constructed with a rectangular anode fixing plate 24a made of a metal such as Ni fixed at the distal end of the lead pin 14 and a plate-like anode (anode plate) 24b fixed on a front surface 24aB of the anode fixing plate 24a. A part of the front surface 24aB of the anode fixing plate 24a is not covered with the anode plate 24a. The anode plate 24b is made of a high melting point metal such as molybdenum or tungsten. In this specification, the high melting point metal means one of a group of materials having a melting point higher than that (1414° C.) of silicon.

The anode support member 22 has, at its front portion, an anode accommodation recess portion (depression) 25 for accommodating the anode 24. Further, a protruding portion (depression) 26 for accommodating the lead pin 13 is formed around the center portion of a bottom wall 25A of the anode accommodation recess portion 25. Furthermore, a lead pin accommodation recess portion (depression) 26a is formed at the center portion of the protruding portion 26. A through hole 22b for receiving the lead pin 13 is formed in a lower wall 22a of the anode support member 22 at its rear end. Further, a notched portion 22c for receiving a distal end M1 of an insulating pipe M covering the lead pin 14 is formed at the front end of the lower wall 22a of the anode support member 22. Therefore, when the distal end M1 of the insulating pipe M is mounted on the notched portion 22c while fixing the anode 24 to the lead pin 14, the anode 24 can be arranged in the anode support member 22.

Figure 4:
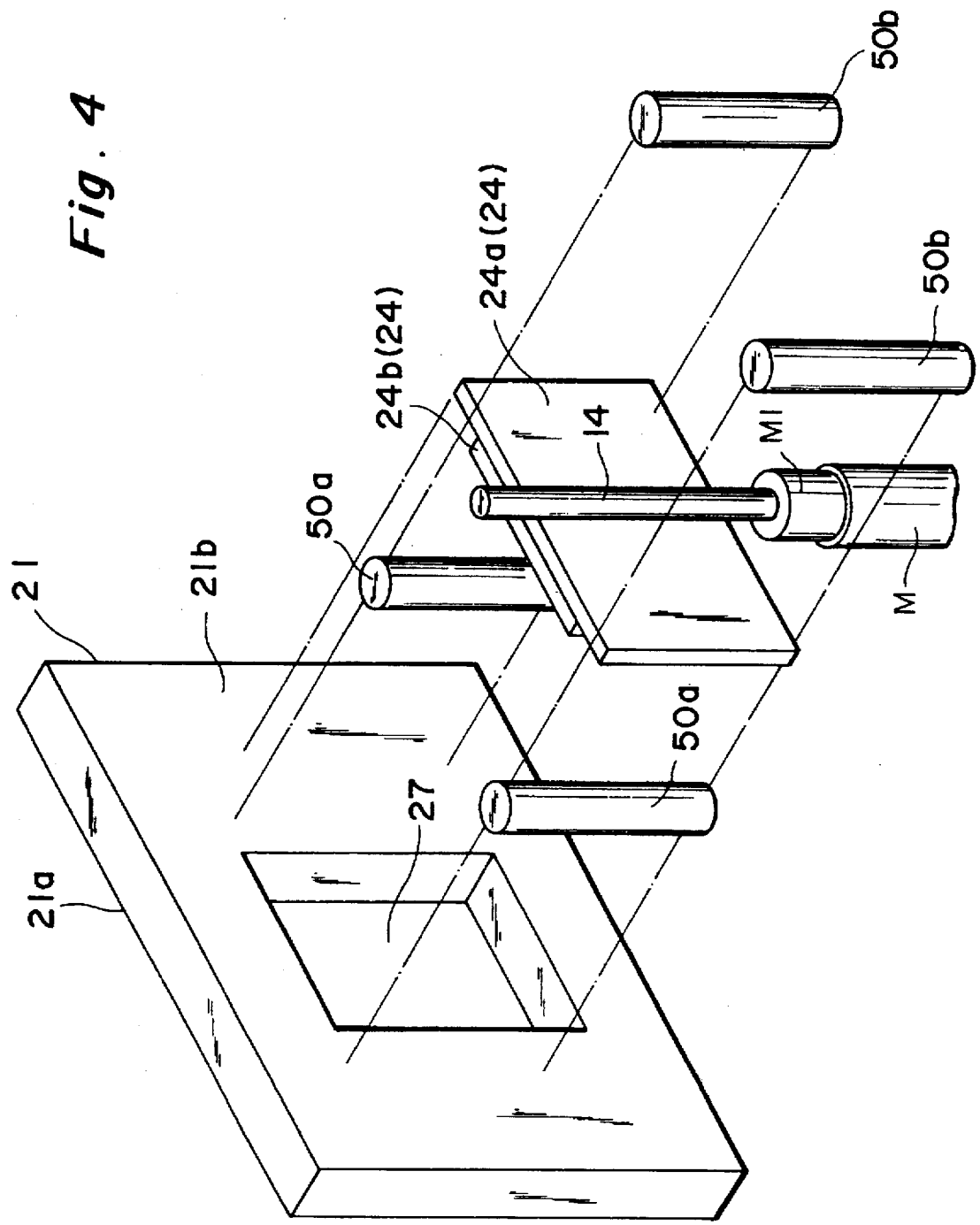
FIG. 4 is a perspective view showing an anode support member and the anode in the light-emitting assembly shown in FIG. 2.

As shown in FIGS. 2, 4, and 5, the plate-like focusing electrode support member 21 arranged in front of the anode 24 has a rectangular opening portion (through hole) 27 at a position facing the anode plate 24b. A focusing electrode fixing plate 28 made of a metal is arranged on and fixed to a front surface 21a of the focusing electrode support member 21. A focusing electrode 29 made of a metal is fixed to a front surface 28a of the focusing electrode fixing plate 28. A focusing opening 29a of the focusing electrode 29 is arranged in the opening portion (through hole) 27 of the focusing electrode support member 21 and opposes the anode plate 24b. In this case, the focusing electrode 29 can be fixed to the focusing electrode support member 21 by welding the focusing electrode 29 to the focusing electrode fixing plate 28.

Further, two columnar first spacers 50a made of a ceramic are arranged between the focusing electrode support member 21 and the anode 24, and are each in contact with both the rear surface 21b of the focusing electrode support member 21 and a front surface 24aB of the anode fixing plate 24a.

Additionally, two columnar second spacers 50b made of a ceramic are arranged opposite to the first spacers 50a on the other side of the anode 24, and each second spacer 50b is in contact with both a rear surface 24aA of the anode fixing plate 24a and a bottom surface 25a (constituting a part of the front surface K of the anode support member 22) of the anode accommodation recess portion 25.

The first spacers 50a and the second spacers 50b are preferably formed of a ceramic having not only electrical insulating properties but also a high thermal conductivity. A so-called conductive ceramic such as beryllium oxide or aluminum nitride is preferably used.

Therefore, as shown in FIG. 5, the interval between the focusing electrode 29 and the anode 24 is defined by the focusing electrode support member 21 and the first spacers 50a. Specifically, the above interval is defined by a surface 50aA of the first spacer 50a, the rear surface 21b of the focusing electrode support member 21 and an inner wall surface 21c of the focusing electrode support member 21, the inner wall surface 21c defining the through hole 27.

Figure 6:
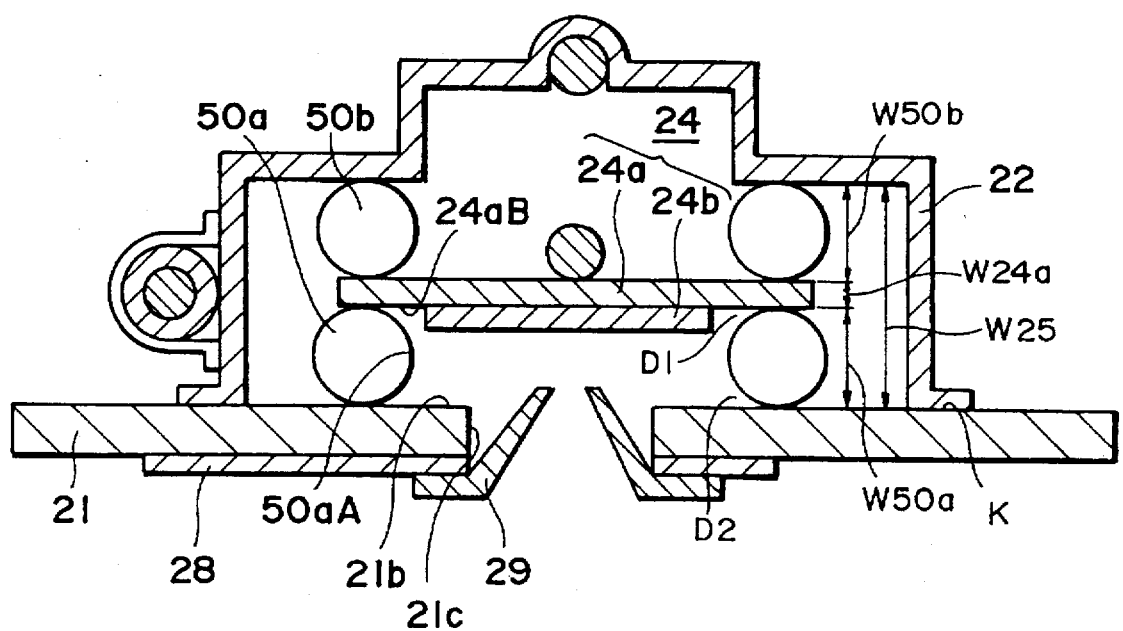
FIG. 6 is a partial sectional view for explaining a structure of the anode accommodation recess portion in the light-emitting assembly shown in FIG. 5.

As shown in FIG. 6, since the first spacers 50a have a columnar shape and the anode plate 24b is not in contact with the first spacers 50a, spaces (depressions) D1, each defined by the surface 50aA of the first spacer 50a, the front surface 24aB of the anode fixing plate 24a and the surface of the anode plate 24b, are formed. Further, spaces (depressions) D2, each defined by the surface 50aA of the first spacer 50a and the rear surface 21b of the focusing electrode support member 21, are also formed.

The anode accommodation recess portion 25 of the anode support member 22, as shown in FIG. 6, has a depth W25 matching a sum of a diameter W50a of the first spacer 50a, a thickness W24a of the anode fixing plate 24a and a diameter W50b of the second spacer 50b, allowing an edge of the front surface K of the anode support member 22 to directly contact the rear surface 21b of the focusing electrode support member 21.

As shown in FIGS. 2 and 5, the front cover 23 made of a metal or a ceramic has an almost U-shaped section and is fixed to both ends of the front surface 21a of the focusing electrode support member 21. A window 30 for passing through light caused by discharge is formed around the center portion of the front cover 23 so that the window 30 is opposite the focusing opening 29a and the anode plate 24b. A spiral hot cathode (filament) 31 for generating thermoelectrons is arranged in a space S formed between the front cover 23 and the focusing electrode support member 21. The hot cathode 31 is arranged outside the optical path of the ultraviolet light to be emitted, i.e., on one side in the front cover 23. The hot cathode 31 has electrode rods 31a and 31b at its two ends.

A discharge straightening plate 32 made of a metal (Ni or SUS) or a ceramic is arranged outside the optical path of the ultraviolet light to be emitted and between the hot cathode 31 and the focusing electrode 29. One end of the discharge straightening plate 32 is fixed to the front surface 21a of the focusing electrode support member 21 while the other end is in contact with an inner wall 23a of the front cover 23. The discharge straightening plate 32 also has a slit 32a for causing the hot cathode 31 to communicate with the focusing electrode 29. Thermoelectrons generated from the hot cathode 31 are passed through the slit 32a to be straightened.

Assembling of the light-emitting assembly 20 will be described below.

In a case where the front cover 23 and the discharge straightening plate 32 are made of a metal, as shown in FIG. 2, a pair of left and right flange portions 23b are integrally formed at the two ends of the metal front cover 23. The flange portions 23b are brought into contact with the front surface 21a of the focusing electrode support member 21 and are fixed to the focusing electrode support member 21 by welding. Further, a projecting piece 32b is integrally formed at one end of the metal discharge straightening plate 32. The projecting piece 32b is brought into contact with the front surface 21a of the focusing electrode support member 21 inside the flange portions 23b and fixed to the focusing electrode support member 21 by welding.

On the other hand, in a case where the front cover 23 and the discharge straightening plate 32 are made of a ceramic, the front cover 23 and the discharge straightening plate 32 are fixed to the focusing electrode support member 21 by using rivets or the like. Although not illustrated, a bendable pawl piece is formed on the focusing electrode support member 21, and pawl through holes for receiving the pawl piece are formed in the front cover 23 and the discharge straightening plate 32. When the pawl piece of the focusing electrode support member 21 is inserted into the pawl through holes of the front cover 23 and the discharge straightening plate 32 and bent, the front cover 23 and the discharge straightening plate 32 can be fixed to the focusing electrode support member 21.

As shown in FIGS. 2 and 5, the focusing electrode fixing plate 28 is fixed to the front surface 21a of the focusing electrode support member 21 by welding it inside the front cover 23. In addition, flange portions 22d of the anode support member 22 are fixed to the rear surface 21b of the focusing electrode support member 21 by welding.

The focusing electrode fixing plate 28 has a plate-like cover portion 28b which extends backward from the upper end thereof and is integrally formed therewith. The shape of the cover portion 28b almost matches that of the upper opening portion of the anode support member 22. Therefore, when the focusing electrode fixing plate 28 is fixed to the focusing electrode support member 21, the upper opening portion of the anode support member 22 can be closed by the cover portion 28b (shown in FIG. 1).

A ceramic cylindrical member 43 for receiving an L-shaped electrode rod 48 is disposed at a side portion of the anode support member 22. This cylindrical member 43 is fixed to the outer side surface of the anode support member 22 by semicircular lock members 46 which are welded to the anode support member 22.

The distal end of the lead pin 13 inserted in the through hole 22b is welded to a tongue piece 47 integrally formed at the head portion (the cover portion 28b) of the focusing electrode fixing plate 28 (shown in FIG. 1). To fix the hot cathode 31 in the space S, the electrode rod 48 is inserted into the cylindrical member 43, and thereafter, the lower end of the electrode rod 48 is welded to the distal end of the lead pin 15. Additionally, the electrode rod 31b of the hot cathode 31 is welded to the distal end of the electrode rod 48 while the electrode rod 31a of the hot cathode 31 is welded to the distal end of the lead pin 16.

As shown in FIGS. 3–6, two columnar first spacers 50a made of an insulating ceramic are arranged between the focusing electrode support member 21 and the anode fixing plate 24a of the anode 24. The first spacers 50a are each in contact with the rear surface 21b of the focusing electrode support member 21 and the front surface 24aB of the anode fixing plate 24a, on both sides in the anode accommodation recess portion 25. Further, two columnar second spacers 50b made of an insulating ceramic are arranged between the anode fixing plate 24a of the anode 24 and the bottom wall 25A of the anode support member 22. The second spacers 50b are each in contact with the rear surface 24aA of the anode fixing plate 24a and the bottom surface 25a of the anode accommodation recess portion 25 (constituting a part of the front surface K of the anode support member 22) on both sides in the anode accommodation recess portion 25. Therefore, the anode 24 can be clamped between the two first spacers 50a and the two second spacers 50b, which oppose each other while sandwiching the anode fixing plate 24a therebetween. When the focusing electrode support member 21 and the anode support member 22 are assembled and fixed by means of welding, the anode 24 is firmly held, by the pressing force from the first spacers 50a and the second spacers 50b, between the rear surface 21b of the focusing electrode support member 21 and the bottom surface 25a of the anode accommodation recess portion 25 of the anode support member 22. Therefore, a predetermined interval between the focusing electrode 29 and the anode 24 can always be kept constant by the first spacers 50a and the focusing electrode support member 21.

Figure 7:
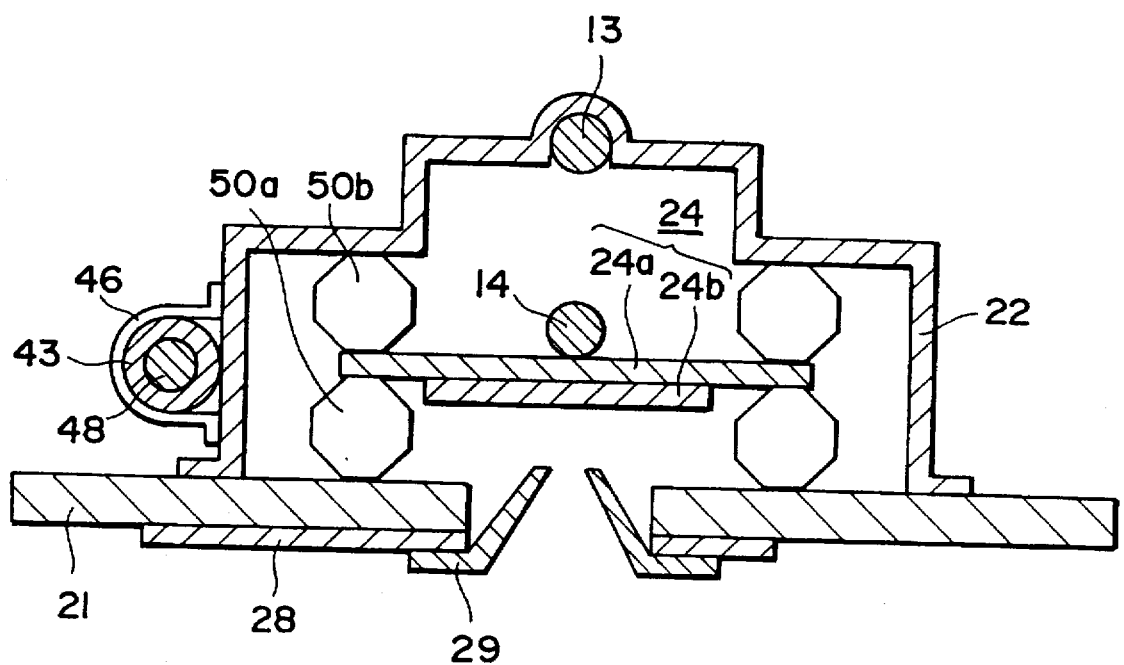
FIG. 7 is a partial sectional view of another embodiment of the light-emitting assembly according to the present invention.

Although columnar spacers are used in the embodiment mentioned above, spacers having a spherical, prismatic, or block-like shape may be used as the first spacers 50a as well as the second spacers 50b. FIG. 7 shows another embodiment using therein octagonal prismatic first spacers 50a and octagonal prismatic second spacers 50b.

Next, the operation of the above-described side-on type deuterium discharge tube 10 will be described below.

A power of about 10 W is supplied from the external power supply (not shown) to the hot cathode 31 about 20 seconds before discharge to preheat the hot cathode 31. Thereafter, a DC open-circuit voltage of about 150 V is applied between the hot cathode 31 and the anode 24, thereby preparing for arc discharge.

Upon completion of the above preparation, a trigger voltage of about 350 to 500 V is applied between the hot cathode 31 and the anode 24. Under this condition, thermoelectrons emitted from the hot cathode 31 pass through the elongated slit 32a of the discharge straightening plate 32 toward the anode plate 24b while being converged by the focusing opening 29a of the focusing electrode 29. Arc discharge occurs in front of the focusing opening 29a. Ultraviolet light emitted from an arc ball (high-density discharge area) generated by this arc discharge passes through the window 30 and is then projected outward through the circumferential surface of the glass envelope 11.

The anode 24 and the focusing electrode 29 are heated to a high temperature exceeding several hundreds °C. This heat is dissipated through the above-described members made of a ceramic or a metal as needed. Since the anode 24 is firmly held by the anode support member 22 and the focusing electrode support member 21 between the first spacers 50a and the second spacers 50b, and the focusing electrode 29 is firmly held by the focusing electrode support member 21, deformation of the above members is prevented even in a high temperature state during long-time continuous light emission. Therefore, a satisfactory positional precision between the anode 24 and the focusing electrode 29 can be kept constant.

Further, an electrode material sputtered from the anode plate 24b by thermoelectrons during light emission of the gas discharge tube is prevented from depositing into the depressions D1 as well as the depressions D2. Therefore, a short circuit between the focusing electrode 29 and the anode 24 can be fully prevented.

A gas discharge tube according to the second embodiment of the present invention will be described below. The gas discharge tube of this embodiment is a head-on type deuterium discharge tube which emits light from the head portion of the tube. Note that, in this embodiment, the front and rear sides are defined on the basis of the light emission direction.

Figure 8:
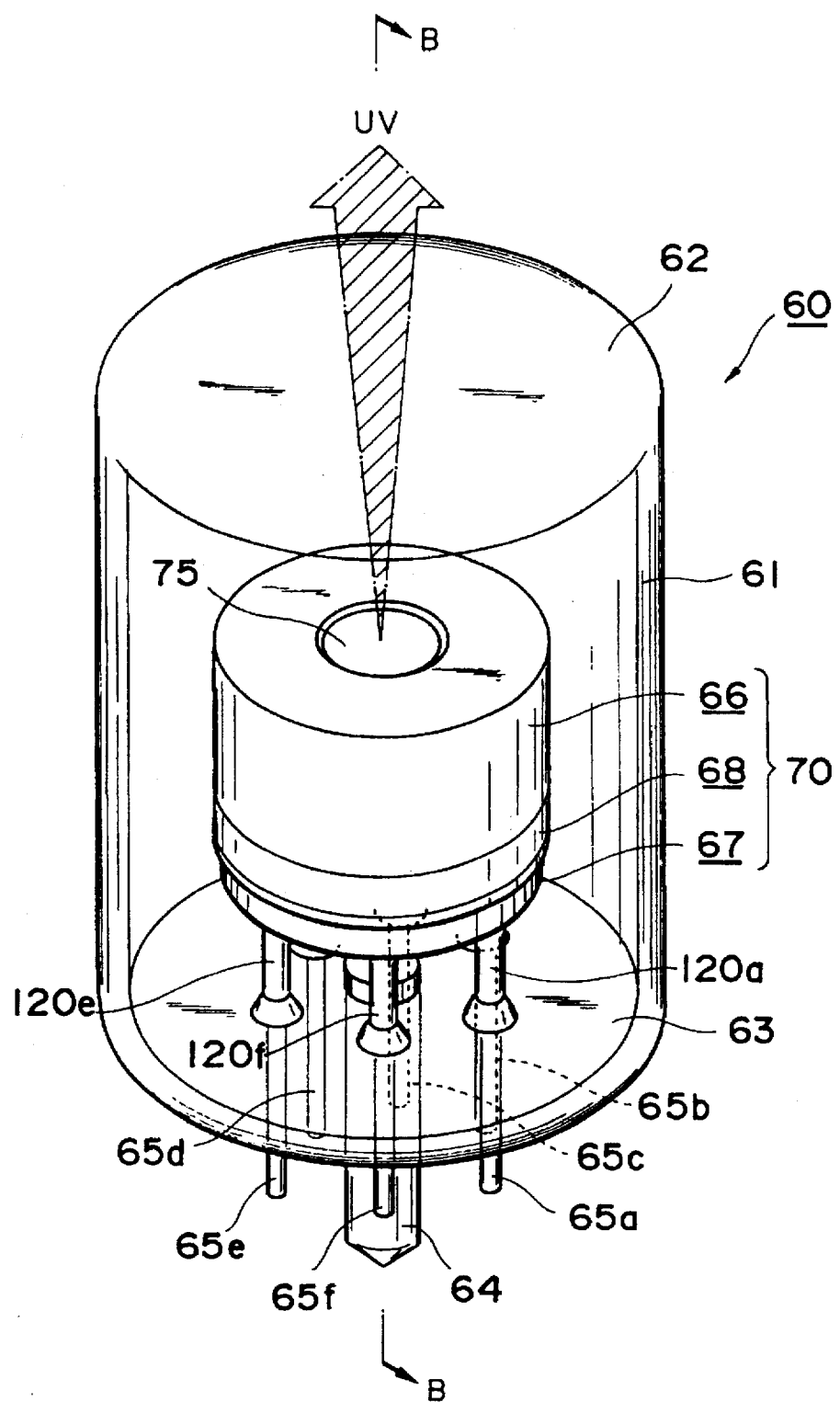
FIG. 8 is a perspective view showing an embodiment (second embodiment) of a head-on type gas discharge tube according to the present invention.

In a deuterium discharge tube 60 shown in FIG. 8, a light-emitting assembly 70 is accommodated in a cylindrical glass envelope 61. Deuterium gas (not shown) is sealed in the envelope 61 at about several Torr. The envelope 61 has a disk-like light-emitting surface 62 at the head portion and a disk-like stem 63 at the bottom portion. A tip tube 64 for exhausting/sealing a gas is provided to the stem 63. Upon completion of exhausting and then sealing of a gas in the envelope 61 through the tip tube 64, the tip tube 64 can be closed to hermetically seal the envelope 61. The envelope 61 is formed of an ultraviolet light-transmitting glass or quartz glass having a high transmissivity to ultraviolet light.

Six lead pins 65a to 65f are fixed to the stem 63. The lead pins 65a to 65f extend through the stem 63 and are connected to an external power supply (not shown) while being covered with insulating members 120a to 120f, respectively (in FIG. 8, the insulating members 120b to 120d are hidden by the light-emitting assembly 70). The light-emitting assembly 70 has a front cover 66 arranged in the front and made of a metal (Ni or SUS) or a ceramic; an anode support member 67 arranged at the rear of the front cover 66 and made of a metal such as Ni or SUS; and a focusing electrode support member 68 fixed between the anode support member 67 and the front cover 66 and made of a metal such as Ni or SUS.

The structure of the light-emitting assembly 70 will be described below in detail.

Figure 9:
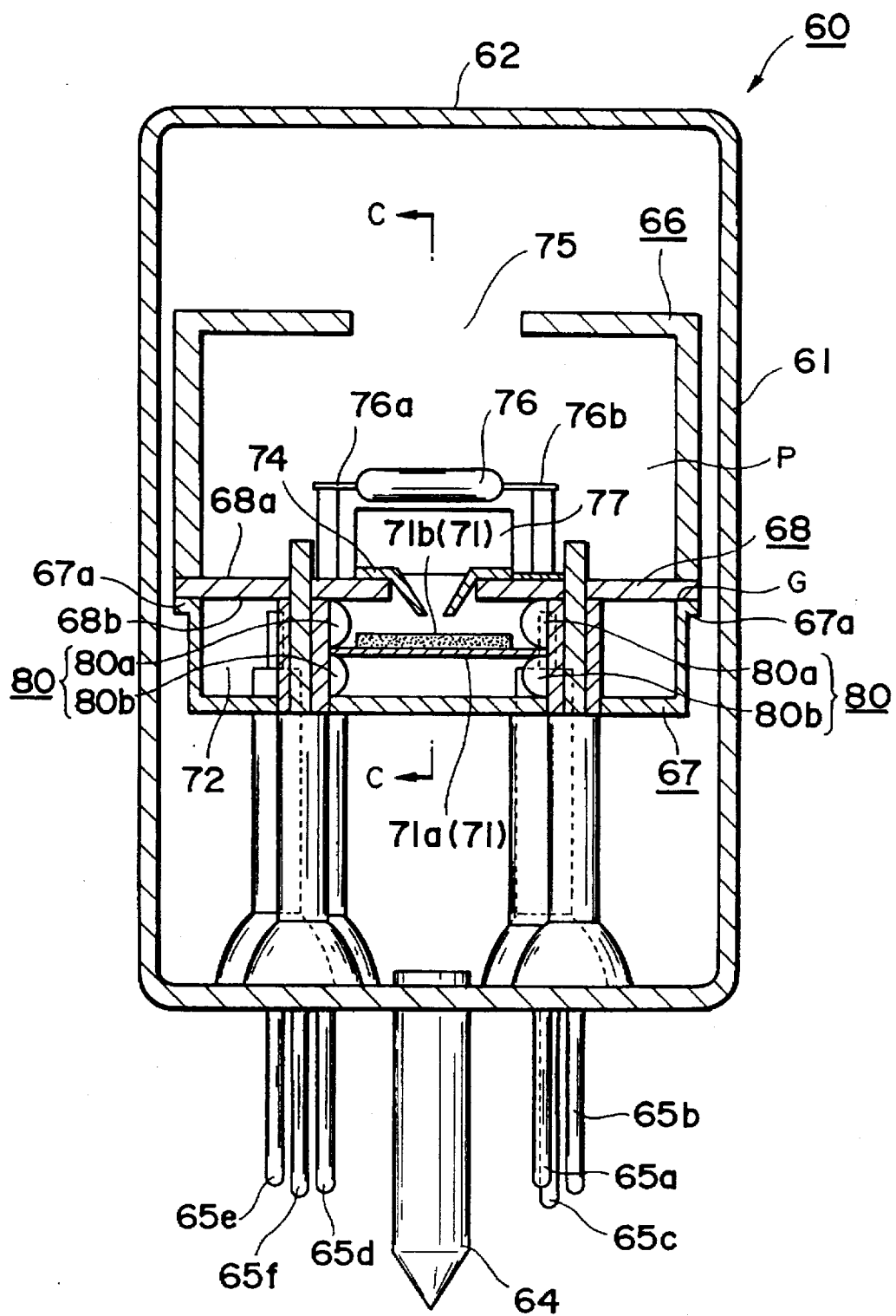
FIG. 9 is a vertical sectional view of the gas discharge tube shown in FIG. 8 (taken along a line B—B in FIG. 8).
Figure 10:
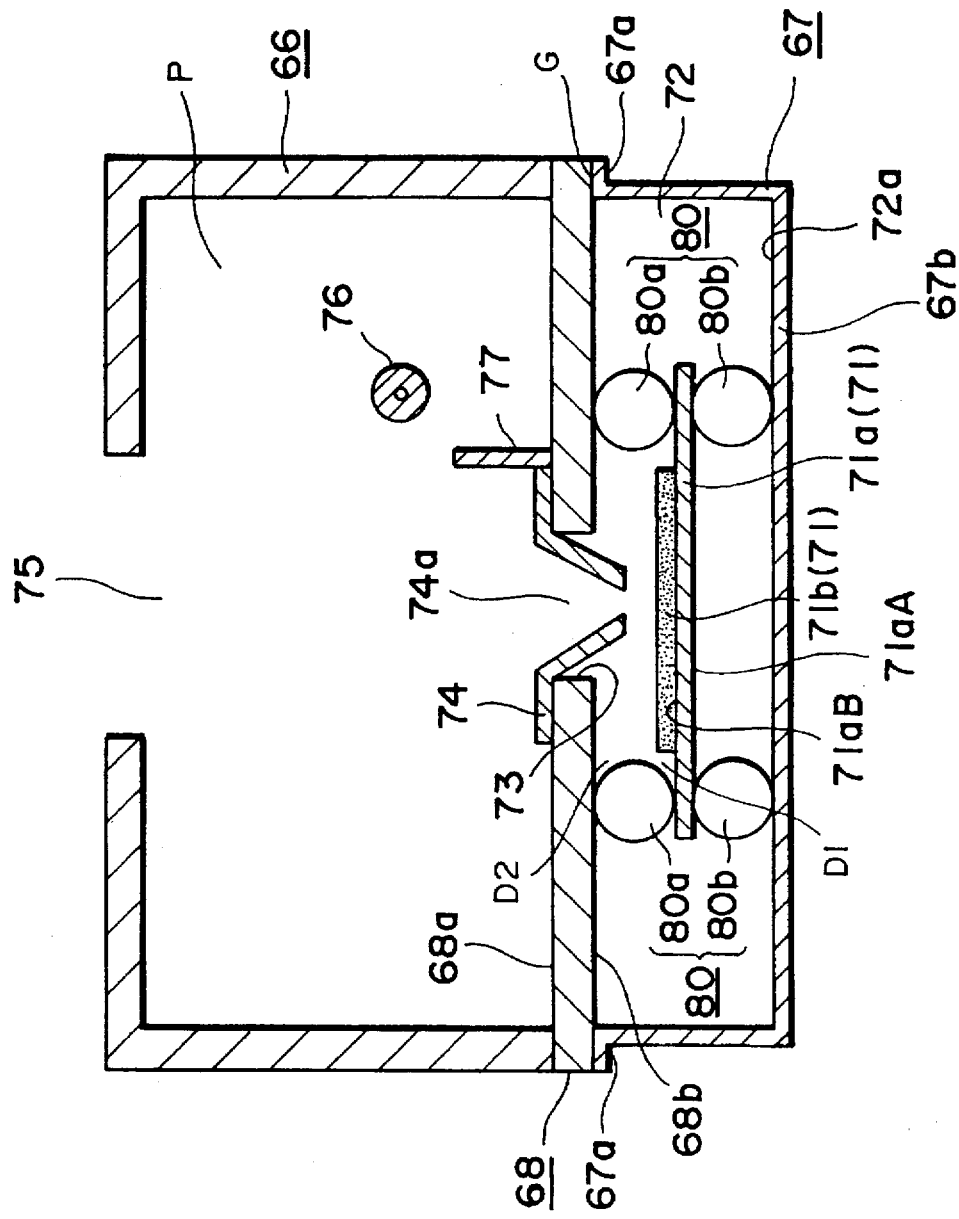
FIG. 10 is a vertical sectional view of a light-emitting assembly of the gas discharge tube shown in FIG. 8 (taken along a line C—C in FIG. 9).

As shown in FIGS. 9 and 10, an anode 71 is fixed at the distal end of the lead pin 65c extending through the anode support member 67. This anode 71 is constituted by a rectangular anode fixing plate 71a fixed at the distal end of the lead pin 65c, and a plate-like anode (anode plate) 71b fixed on a front surface 71aB of the anode fixing plate 71a. A circumferential portion of the front surface 71aB of the anode fixing plate 71a is not covered with the anode plate 71b. The anode fixing plate 71a is made of a metal such as Ni, and the anode plate 71b is made of a high melting point metal such as molybdenum or tungsten.

The cylindrical anode support member 67 having an almost concave section has, at its front portion, an anode accommodation recess portion 72 for accommodating the anode 71.

To arrange the anode support member 67 in the envelope 61, the anode support member 67 is fixed at the distal end of the lead pin 65f. In assembling the light-emitting assembly 70, a flange portion 67a of the anode support member 67 is brought into contact with the circumferential end of a rear surface 68b of the focusing electrode support member 68, and thereafter, the flange portion 67a is fixed to the focusing electrode support member 68 by welding.

The plate-like focusing electrode support member 68 arranged in front of the anode 71 has a rectangular opening portion (through hole) 73 at a position opposite the anode plate 71b. A metal focusing electrode 74 is fixed to a front surface 68a of the focusing electrode support member 68. A focusing opening 74a of the focusing electrode 74 is arranged in the opening portion 73 of the focusing electrode support member 68 and is opposite to the anode plate 71b. In addition, the focusing electrode 74 is welded to the distal end of the lead pin 65a extending through the anode support member 67 and the focusing electrode support member 68. To arrange the focusing electrode support member 68 in the envelope 61, the focusing electrode support member 68 is fixed at the distal end of the lead pin 65e.

A window 75 for passing through light caused by discharge is formed around the center portion of the front cover 66 having a cup-like section so that the window 75 is opposite to the focusing opening 74a and the anode plate 71b. A hot cathode 76 for generating thermoelectrons is arranged in a space P formed between the front cover 66 and the focusing electrode support member 68. The hot cathode 76 is arranged outside the optical path of the ultraviolet light to be emitted, i.e., on one side in the front cover 66. The hot cathode 76 has electrode rods 76a and 76b at its two ends. The electrode rods 76a and 76b are respectively welded to the distal ends of the lead pins 65b and 65d extending through the anode support member 67 and the focusing electrode support member 68.

To assemble the light-emitting assembly 70, in a case where the front cover 66 is formed of a metal, the front cover 66 is fixed to the front surface 68a of the metal focusing electrode support member 68 by welding. On the other hand, in a case where the front cover 66 is formed of a ceramic, the front cover 66 is fixed to the metal focusing electrode support member 68 by rivets or pawl pieces (not shown).

A discharge straightening plate 77 made of a metal (Ni or SUS) or a ceramic is arranged outside the optical path of the ultraviolet light to be emitted and between the hot cathode 76 and the focusing electrode 74. The discharge straightening plate 77 stands on the front surface 68a of the focusing electrode support member 68 while contacting the focusing electrode 74.

Eight spherical spacers 80 (four first spacers 80a and four second spacers 80b) formed from a ceramic having electrical insulating properties are arranged in the anode accommodation recess portion 72 of the anode support member 67. Specifically, the four spherical first spacers 80a are arranged between the focusing electrode support member 68 and the anode fixing plate 71a of the anode 71. Each of first spacers 80a are in contact with both a rear surface 68b of the focusing electrode support member 68 and the front surface 71aB of the anode fixing plate 71a, around the focusing opening 74a in the anode accommodation recess portion 72 (at four corners of the front surface 71ab of the anode fixing plate 71a). Further, the four spherical second spacers 80b are arranged between the anode fixing plate 71a of the anode 71 and a bottom wall 67b of the anode support member 67. The second spacers 80b are each in contact with both a bottom surface 72a (constituting a part of the front surface G of the anode support member 67) of the anode accommodation recess portion 72 and the rear surface 71aA of the anode fixing plate 71a, around the focusing opening 74a in the anode accommodation recess portion 72 (at four corners of the rear surface 71aA of the anode fixing plate 71a). Therefore, the anode 71 can be clamped between the four first spacers 80a and the four second spacers 80b, which oppose each other while sandwiching the anode fixing plate 71a therebetween.

When the focusing electrode support member 68 and the anode support member 67 are assembled and fixed by means of welding, the anode 71 is firmly held, by the pressing force given between the first spacers 80a and the second spacers 80b, between the rear surface 68b of the focusing electrode support member 68 and the bottom surface 72a of the anode accommodation recess portion 72 of the anode support member 67. Therefore, a predetermined interval between the focusing electrode 74 and the anode 71 can always be maintained constant by the first spacers 80a and the focusing electrode support member 68. Note that the first spacers 80a and the second spacers 80b may also have a columnar, prismatic, or block-like shape.

Next, the operation of the above-described head-on type deuterium discharge tube 60 will be described below.

A power of about 10 W is supplied from the external power supply (not shown) to the hot cathode 76 about 20 seconds before discharge to preheat the hot cathode 76. Thereafter, a DC open-circuit voltage of about 150 V is applied between the hot cathode 76 and the anode 71, thereby preparing for arc discharge.

Upon completion of the above preparation, a trigger voltage of about 350 to 500 V is applied between the hot cathode 76 and the anode 71. Under this condition, thermoelectrons emitted from the hot cathode 76 are straightened by the discharge straightening plate 77 toward the anode plate 71b while being converged through the focusing opening 74a of the focusing electrode 74. Arc discharge occurs in front of the focusing opening 74a. Ultraviolet light emitted from an arc ball generated by this arc discharge passes through the window 75 and is then projected outward through the light-emitting surface 62 of the glass envelope 61.

The anode 71 and the focusing electrode 74 are heated to a high temperature exceeding several hundreds °C. This heat is dissipated by the above-described members, which are formed from a ceramic or a metal, as needed. Since the anode 71 is firmly held by the anode support member 67 and the focusing electrode support member 68 through the first spacers 80a and the second spacers 80b, and the focusing electrode 74 is firmly held by the focusing electrode support member 68, deformation of the above members is prevented even in a high temperature state during long-time continuous light emission. Therefore, a satisfactory positional precision between the anode 71 and the focusing electrode 74 can be kept constant.

Further, an electrode material sputtered from the anode plate 71b by thermoelectrons during light emission of the gas discharge tube is prevented from depositing into the depressions D1 defined by the surface of the first spacer 80a, the front surface 71aB of the anode fixing plate 71a and the surface of the anode plate 71b and as well as the depressions D2 defined by the surface of the first spacer 80a and the rear surface 68b of the focusing electrode support member 68. Therefore, a short circuit between the focusing electrode 74 and the anode 71 can be fully prevented.

The gas discharge tube of the present invention is not limited to the above embodiments, and various changes and modifications can also be made.

As has been described above in detail, in the gas discharge tube according to the present invention, the first spacer is brought into contact with both the rear surface of the focusing electrode support member and the front surface of the anode, and the second spacer is brought into contact with both the front surface (bottom surface) of the anode support member and the rear surface of the anode. Therefore, the anode is clamped between the first spacer and the second spacer, which oppose each other while sandwiching the anode therebetween, and the anode is firmly held between the rear surface of the focusing electrode support member and the front surface of the anode support member, thereby holding constant the interval between the focusing electrode and the anode using the first spacer and the focusing electrode support member. With this arrangement, the anode is firmly held by the first spacer and the second spacer. Deformation of the above members is prevented even in a high temperature state during long-time continuous light emission, and a satisfactory positional precision between the anode and the focusing electrode can be kept constant to prevent deformation of the path of the thermoelectrons between the focusing electrode and the anode. Thus the arc discharge state can be held stable, and the stability of light emission of the discharge tube will not be impaired. Therefore, the operational stability of the gas discharge tube can be improved, and the service life thereof can also be prolonged.

In addition, in the gas discharge tube of the present invention, since the first spacer and the second spacer are made of an insulator such as a ceramic, the electrical insulating effect between the focusing electrode and the anode, as well as the heat dissipation effect from the anode and the focusing electrode, can be promoted.

Further, in the gas discharge tube of the present invention, a portion such as a depression on which the sputtered electrode material is prevented from depositing can be easily formed in the space formed between the focusing electrode support member and the anode support member, by means of appropriate selection of the shape and the position of the spacer, particularly the first spacer, to be used. For this reason, a short circuit between the focusing electrode and the anode can be easily and fully prevented by simple selection of the shape and the position of the spacer, particularly the first spacer, to be used.

Therefore, a gas discharge tube having a long service life and capable of improving the operational stability during long-time continuous light emission can be easy provided.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A gas discharge tube comprising:
    a focusing electrode support member made of a conductive material, said focusing electrode support member having a front surface and a rear surface the rear surface communicating with the front surface by a through hole;
    a hot cathode for emitting thermoelectrons, said hot cathode being located at the front surface side of said focusing electrode support member;
    an anode for receiving the thermoelectrons emitted from said hot cathode, said anode being located at the rear surface side of said focusing electrode support member and facing an opening of the through hole;
    a focusing electrode being supported by said focusing electrode support member, said focusing electrode having a focusing opening located at a position of an opening of the through hole for converging paths of the thermoelectrons;
    a first insulating spacer arranged between said focusing electrode support member and one side of said anode and being in contact with both the rear surface of said focusing electrode support member and a front surface of said anode;
    a second insulating spacer arranged at the other side of said anode opposite said first spacer and in contact with a rear surface of said anode; and
    an anode support member made of a conductive material, said anode support member located on a side opposite to said focusing electrode support member and having a surface in contact with a surface of said second spacer for pushing said anode onto the rear surface of said focusing electrode support member between said first spacer and second spacer, whereby an interval between said focusing electrode and said anode is defined by said focusing electrode support member and said first spacer.

2. A gas discharge tube according to claim 1, wherein said interval between said focusing electrode and said anode is defined by a surface of said first spacer, the rear surface of said focusing electrode support member and an inner wall surface of said focusing electrode support member, said inner wall surface defining said through hole.

3. A gas discharge tube according to claim 1, wherein said first and second spacers are made of a ceramic.

4. A gas discharge tube according to claim 1, wherein said focusing electrode support member and said anode support member are made of a metal.

5. A gas discharge tube according to claim 1, wherein said anode comprises:
    an anode fixing plate made of a conductive material, said anode fixing plate having a front surface being in contact with said first spacer and a rear surface being in contact with said second spacer; and
    an anode plate for receiving the thermoelectrons, said anode plate being made of a high melting point metal and fixed on the front surface of said anode fixing plate.

6. A gas discharge tube according to claim 5, wherein a part of the front surface of said anode fixing plate is not covered with said anode plate to contact said anode fixing plate with said first spacer, and said anode plate, which does not contact said first spacer, forms a space defined by a surface of said first spacer, a front surface of said anode fixing plate and a surface of said anode plate.

7. A gas discharge tube according to claim 1, wherein said first spacer has a shape which enables the formation of depressions defined by a surface of said first spacer and the rear surface of said focusing electrode support member and depressions defined by the surface of said first spacer and the front surface of said anode.

8. A gas discharge tube according to claim 1, wherein said first spacer has a shape selected from the group of a columnar shape, a prismatic shape, a spherical shape and a block-like shape.

9. A gas discharge tube according to claim 1, wherein said anode support member further has a depression at its surface which faces to said focusing electrode support member for accommodating said anode, said first spacer and said second spacer, said depression extending from the surface of said anode support member in a vertical direction with respect to the rear surface of said focusing electrode support member.

10. A gas discharge tube according to claim 1, further comprising a discharge straightening plate for discharge shielding, said discharge straightening plate being positioned and mounted on the front surface of said focusing electrode support member and having a slit for passing thermoelectrons emitted from said hot cathode.

11. A gas discharge tube according to claim 1, further comprising a front cover for discharge shielding, said front cover being positioned and mounted on the front surface of said focusing electrode support member to accommodate said hot cathode and said discharge straightening plate in a space defined by said front cover and said focusing electrode support member, said front cover having a window located at a position facing the focusing opening of said focusing electrode, for outputting light caused by discharge.

12. A gas discharge tube comprising:
    an envelope for sealing a gas therein;
    lead pins introduced into an inner space of said envelope from outside of said envelope; and
    a light-emitting assembly positioned at distal ends of said lead pins and supported by said lead pins while spaced from an inner side wall of said envelope, said light-emitting assembly including;
        a focusing electrode support member made of a conductive material, said focusing electrode support member having a front surface and a rear surface, the rear surface communicating with the front surface by a through hole;
        a hot cathode for emitting thermoelectrons, said hot cathode being located at the front surface side of said focusing electrode support member and connected to and supported by at least one of said lead pins;
        an anode for receiving the thermoelectrons emitted from said hot cathode, said anode being located at the rear surface side of said focusing electrode support member facing an opening of the through hole and connected to and supported by another one of said lead pins;

a focusing electrode supported by said focusing electrode support member, said focusing electrode having a focusing opening located at a position of an opening of the through hole for converging paths of the thermoelectrons and connected to and supported by still another one of said lead pins;

a first insulating spacer arranged between said focusing electrode support member and one side of said anode and in contact with both the rear surface of said focusing electrode support member and a front surface of said anode;

a second insulating spacer arranged at the other side of said anode opposite said first spacer and in contact with a rear surface of said anode; and an anode support member made of a conductive material, said anode support member being located on a side opposite to said focusing electrode support member and having a surface in contact with a surface of said second spacer for pushing said anode onto the rear surface of said focusing electrode support member between said first spacer and second spacer, whereby an interval between said focusing electrode and said anode is defined by said focusing electrode support member and said first spacer.

13. A gas discharge tube according to claim 12, wherein said interval between said focusing electrode and said anode is defined by a surface of said first spacer, the rear surface of said focusing electrode support member and an inner wall surface of said focusing electrode support member, said inner wall surface defining said through hole.

14. A gas discharge tube according to claim 12, wherein said first and second spacers are made of a ceramic.

15. A gas discharge tube according to claim 12, wherein said focusing electrode support member and said anode support member are made of a metal.

16. A gas discharge tube according to claim 12, wherein said anode comprises:

an anode fixing plate made of a conductive material, said anode fixing plate having a front surface being in contact with said first spacer and a rear surface being in contact with said second spacer; and an anode plate for receiving the thermoelectrons, said anode plate being made of a high melting point metal and fixed on the front surface of said anode fixing plate.

17. A gas discharge tube according to claim 16, wherein a part of the front surface of said anode fixing plate is not covered with said anode plate to contact said anode fixing plate with said first spacer, and said anode plate, which does not contact said first spacer, forms a spacer defined by a surface of said first spacer, a front surface of said anode fixing plate and a surface of said anode plate.

18. A gas discharge tube according to claim 12, wherein said first spacer has a shape which enables the formation of depressions defined by a surface of said first spacer and the rear surface of said focusing electrode support member and depressions defined by the surface of said first spacer and the front surface of said anode.

19. A gas discharge tube according to claim 12, wherein said first spacer has a shape selected from the group of a columnar shape, a prismatic shape, a spherical shape and a block-like shape.

20. A gas discharge tube according to claim 12, wherein said anode support member further has a depression at its surface facing said focusing electrode support member for accommodating said anode, said first spacer and said second spacer, said depression extending from the surface of said anode support member in a vertical direction with respect to the rear surface of said focusing electrode support member.

21. A gas discharge tube according to claim 12, further comprising a discharge straightening plate for discharge shielding, said discharge straightening plate being positioned and mounted on the front surface of said focusing electrode support member and having a slit for passing thermoelectrons emitted from said hot cathode.

22. A gas discharge tube according to claim 12, further comprising a front cover for discharge shielding, said front cover being positioned and mounted on the front surface of said focusing electrode support member to accommodate said hot cathode and said discharge straightening plate in a space defined by said front cover and said focusing electrode support member, said front cover having a window located at a position facing the focusing opening of said focusing electrode, for outputting light caused by discharge.

* * * * *